United States Patent [19]

Reiff

[11] Patent Number: 5,258,452

[45] Date of Patent: Nov. 2, 1993

[54] POLYISOCYANATE MIXTURES, A PROCESS FOR THEIR PRODUCTION AND THEIR USE

[75] Inventor: Helmut Reiff, Leverkusen, Fed. Rep. of Germany

[73] Assignee: Bayer Aktiengesellschaft, Leverkusen, Fed. Rep. of Germany

[21] Appl. No.: 940,564

[22] Filed: Sep. 4, 1992

[30] Foreign Application Priority Data

Sep. 10, 1991 [DE] Fed. Rep. of Germany ....... 4129953

[51] Int. Cl.$^5$ .............................................. C08G 18/30
[52] U.S. Cl. ........................... 524/839; 524/840; 252/182.2; 252/182.21; 252/182.22; 528/49; 560/355
[58] Field of Search ............ 252/182.2, 182.21, 182.22; 528/49; 524/839, 840; 560/355

[56] References Cited

U.S. PATENT DOCUMENTS

| | | | |
|---|---|---|---|
| 2,968,672 | 1/1961 | Ephraim | 560/33 |
| 3,792,023 | 2/1974 | Havenith et al. | 528/78 |
| 3,801,272 | 4/1974 | Wagner et al. | 8/127.6 |
| 3,959,348 | 5/1976 | Reiff et al. | 560/26 |
| 4,238,378 | 12/1980 | Markusch et al. | 528/67 |
| 4,258,140 | 3/1981 | Horacek et al. | 521/114 |
| 4,433,095 | 2/1984 | Hombach et al. | 524/563 |
| 4,663,377 | 5/1987 | Hombach et al. | 524/196 |
| 5,075,345 | 12/1991 | Mayer et al. | 521/159 |

Primary Examiner—John Kight, III
Assistant Examiner—Rachel Johnson
Attorney, Agent, or Firm—Joseph C. Gil; Godfried R. Akorli; Lyndanne M. Whalen

[57] ABSTRACT

The present invention relates to polyisocyanates containing tertiary nitrogen with an (average) NCO functionality of 2.3 to 4.3 which, despite the presence of tertiary nitrogen and isocyanate groups in the same molecule, would be stable in storage, could be dissolved or dispersed in water without difficulty, optionally after at least partial alkylation or protonation, and would be suitable as starting components in the production of polyurethane plastics and, above all, as crosslinking agents for water-containing binders or binder components.

4 Claims, No Drawings

POLYISOCYANATE MIXTURES, A PROCESS FOR THEIR PRODUCTION AND THEIR USE

BACKGROUND OF THE INVENTION

This invention relates to new mixtures of polyisocyanates containing basic (tertiary) and/or quaternary nitrogen and having an average NCO functionality of 2.3 to 4.3, to a process for the production of these mixtures and to their use as a starting material in the production of polyurethane plastics or as a crosslinking agent for water-containing polymeric binders.

The significance of water-containing binders for coatings of all kinds is growing steadily on account of stricter emission guidelines and ecological arguments.

Although there are already a number of water-containing binders with a high quality standard, optimal properties can often only be obtained by chemical post-crosslinking during or after film formation.

Aromatic hydrophilically modified polyisocyanates of the type described, for example, in DE-OS 2,359,613 and in EP-A-61,628 are unsuitable for use in water-containing binder systems on account of their high reactivity with water and the resulting emission of carbon dioxide. They are used mainly in the production of foams and in the adhesives field. Isocyanate-functional crosslinking agents for water-based coating systems can only be produced from the less reactive (cyclo)aliphatic polyisocyanates.

EP-A-206,059 describes hydrophilically modified aliphatic polyisocyanates as an additive for water-based adhesives. The emulsifiability of these polyisocyanates is achieved by the incorporation of polyether chains comprising ethylene oxide units. However, polyisocyanates hydrophilicized in this way are only suitable to a limited extent for certain applications on account of the permanent hydrophilic character of the films due to their relatively high polyether content.

The problem addressed by the present invention was to provide new polyisocyanates containing tertiary nitrogen with an (average) NCO functionality of 2.3 to 4.3 which, despite the presence of tertiary nitrogen and isocyanate groups in the same molecule, would be stable in storage, could be dissolved or dispersed in water without difficulty, optionally after at least partial alkylation or protonation, and would be suitable as starting components in the production of polyurethane plastics and, above all, as crosslinking agents for water-containing binders or binder components.

This problem has been solved by the provision of the polyisocyanate mixtures, the process for their production as described hereinafter.

SUMMARY OF THE INVENTION

The present invention relates to polyisocyanate mixtures characterized by a) an average NCO functionality of 2.3 to 4.3,
b) a content of (cyclo)aliphatically bound isocyanate groups (expressed as NCO, molecular weight=42) of 10.0 to 20.5% by weight,
c) a content of incorporated tertiary nitrogen of 5 to 250 and preferably 15 to 100 milliequivalents per 100 g,
d) a content of ethylene oxide units (expressed as $C_2H_4O$, molecular weight=44) arranged in polyether chains of 0 to 15% by weight.

The present invention also relates to a process for the production of these polyisocyanate mixtures, comprising reacting:

A) a polyisocyanate component having an (average) NCO functionality of at least 2.1 and comprising at least one polyisocyanate consisting (cyclo)aliphatically bound isocyanate groups with B) a modifying component comprising a compound containing at least one tertiary nitrogen and at least one isocyanate-reactive group and, optionally, C) a polyether alcohol component containing at least 50% by weight ethylene oxide units incorporated in polyether chains and containing at least one polyether alcohol having a molecular weight of 350 to 3500 and optionally,

D) another polyhydroxyl compound which is different from components B) and C), an NCO:OH equivalent ratio of 2:1 to 75:1 being maintained during the reaction, the type of and quantitative ratios between the starting components mentioned being selected so that the resulting reaction products meet the conditions mentioned above under a) to d).

The present invention also relates to the use of these polyisocyanate mixtures, optionally in at least partly alkylated or protonated form, as starting component in the production of polyurethane plastics.

Finally, the present invention also relates to the use of these polyisocyanate mixtures, optionally in at least partly alkylated or protonated form, as crosslinking agents for water-soluble or water-dispersible binders or binder components in the production of adhesives, coatings and coating materials of all kinds using water-containing coating compounds based on such binders or binder components.

DETAILED DESCRIPTION OF THE INVENTION

Component A) of the invention has an (average) NCO functionality of at least 2.1 and preferably at least 2.8. Typically, the NCO functionality is from 2.1 to 3.8. Component a) comprises at least one organic polyisocyanate containing only (cyclo)aliphatically bound isocyanate groups. The polyisocyanates or polyisocyanate mixtures of component a) may be any uretdione and/or isocyanurate, urethane and/or allophanate, biuret or oxadiazine modified polyisocyanates produced by modification of simple (cyclo)aliphatic diisocyanates of the type described by way of example, in the examples of DE-OSS 1,670,666, 3,700,209 and 3,900,053 or in EP-A-336,205 or in EP-A-339,396. Suitable diisocyanates for the production of such polyisocyanates are, basically, those having a molecular weight in the range from 140 to 400 and containing (cyclo)aliphatically bound isocyanate groups, such as for example 1,4-diisocyanatobutane, 1,6-diisocyanatohexane, 1,5-diisocyanato-2,2-dimethyl pentane, 2,2,4- and 2,4,4-trimethyl-1,6-diisocyanatohexane, lysine diisocyanate, the isomeric perhydroxylylene diisocyanates, decane 1,10-diisocyanate, cyclohexane 1,3- and 1,4-diisocyanate, 1-isocyanato-3,3,5-trimethyl-5-isocyanatomethyl cyclohexane (isophorone diisocyanate) and 4,4-diisocyanatodicyclohexyl methane or mixtures of these diisocyanates. In a particularly preferred embodiment, the starting component A) is an isocyanate-functional polyisocyanates selected from the group consisting essentially of trimeric 1,6-diisocyanatohexanes which are obtained in known manner by catalytic trimerization of 1,6-diisocyanatohexane with isocyanurate formation and which preferably have an NCO content of 19 to 24% by weight and an (average) NCO functionality of 3.4 to 4.4.

The modifying component b) comprising compounds containing at least one tertiary nitrogen and at least one isocyanate-reactive group. Accordingly, in addition to at least one basic nitrogen, these compounds also contain at least one Zerewitinow-active group, such as for example an —OH, —SH or —NHR group.

Suitable modifying component b) is, for example, correspondingly substituted morpholines, piperidines, piperazines, oxazolines, dihydrooxazines, etc., and also primary-tertiary diamines and secondary-tertiary diamines and also aminoalcohols of any kind containing tertiary nitrogen.

The following are examples of specific modifying component b) suitable for use in accordance with the invention: N-(2-hydroxyethyl)-piperidine, N-(2-hydroxypropyl)-piperidine, N-(2-hydroxyethyl)-morpholine, N-(2-hydroxypropyl)-morpholine, N-methyl piperazine, N-methyl-N'-hydroxyethyl piperazine, N-methyl-N'-2-hydroxypropyl piperazine, N-methyl-N'-4-hydroxybutyl piperazine, 2-hydroxyethyl oxazoline, 2-hydroxypropyl oxazoline, 3-hydroxypropyl oxazoline, 2-hydroxyethyl dihydrooxazine, 2-hydroxypropyl dihydrooxazine, 3-hydroxypropyl dihydrooxazine.

Other suitable component b) according to the invention can be primary-tertiary diamines corresponding to formula (I), in which R is a $C_{2-10}$-alkylene group which may be linear or branched, preferably $C_{2-8}$-alkylene and, more preferably, $C_{2-6}$-alkylene. $R^1$ and $R^2$ represent $C_{1-5}$-alkyl or, together with the nitrogen atom, form a 5- or 6-membered ring which may optionally contain an O atom, preferably $C_{1-4}$-alkyl, —(CH$_2$)$_4$, —(CH$_2$)$_5$, —(CH$_2$CH$_2$)$_2$O and, more preferably, CH$_3$, C$_2$H$_5$, (CH$_2$)$_5$, (CH$_2$)$_5$ and —(CH$_2$), CH$_2$)$_2$O,

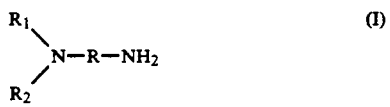

and also NHR$_3$ where R$_3$ has the same meaning as R$_1$ and R$_2$.

The following are mentioned as examples of diamines corresponding to formula (I):

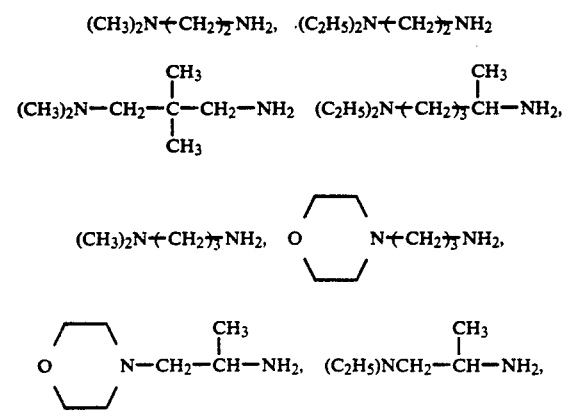

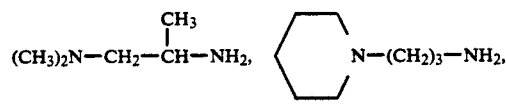

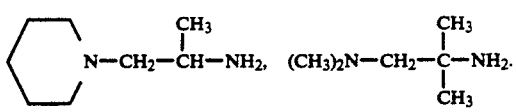

Other suitable starting products of modifying component b) can be tertiary aminoalcohols corresponding to formula (II)

in which R, $R^1$ and $R^2$ are as defined above. The following are mentioned as examples of aminoalcohols corresponding to formula (II): N,N-diethyl ethanolamine, N,N-diethyl propanolamine, N,N-dimethyl ethanolamine, N,N-dimethyl propanolamine, N,N-dibutyl ethanolamine, N,N-dibutyl propanolamine.

The alkoxylation products of these aminoalcohols may also be used in accordance with the invention.

The modifying component b) may also contain either more than one tertiary nitrogen and/or more than one Zerewitinow-active group.

The optional starting component C) is a member selected from polyether alcohols comprising ethylene oxide units incorporated in polyether chains and having an ethylene oxide content of at least 50% by weight. Compounds such as these are, for example, alkoxylation products of monofunctional or polyfunctional starter molecules of the type described in EP-A-206,059, page 8, line 26 to page 9, line 17. They are useful as nonionic hydroxyfunctional emulsifiers which present in such small quantities that they are not capable on their own of ensuring adequate dispersibility in water.

The other optional starting component D) is a member selected from hydroxyfunctional compounds, preferably polyhydroxy compounds having a molecular weight in the range from 62 to 200, which are different from compounds B) and C). Examples of these hydroxyfunctional compounds are ethylene glycol, propylene glycol, glycerol, trimethylolpropane, pentaerythritol or mixtures of these polyhydric alcohols.

To carry out the process according to the invention, the starting compounds are reacted with one another at temperatures of 10° to 100° C. and preferably at temperatures of 20° to 80° C. and at an NCO:OH equivalent ratio of 2:1 to 75:1 and preferably 5:1 to 20:1, preferably until the theoretical NCO content is reached. Depending on the reactivity of the modifying component b) used, the reaction temperature selected is so low that secondary reactions are ruled out. The type of, and quantitative ratios between the starting components are selected within the limits of the foregoing disclosure so that the resulting reaction products have a) an average NCO functionality of at least 2.3 to 4.3 and preferably 2.3 to 3.8,
b) an NCO content of 10.0 to 20.5 and preferably 15.0 to 20.0% by weight, c) a content of chemically incorporated tertiary nitrogen of 15 to 250 and preferably 15 to 100 milliequivalents per 100 g, d) a content of ethylene oxide units incorporated in polyether chains of 0 to 15% by weight and preferably 1 to 5% by weight.

The foregoing data relating to the NCO functionality of the resulting reaction products are based on values which can be calculated from the type and functionality of the starting components in accordance with the following equation:

$$f = \frac{\Sigma val\ NCO - \Sigma val\ OH}{\Sigma mol\ (NCO + OH) - \Sigma val\ OH}$$

The foregoing data relating to the basic nitrogen and isocyanate group contents are based on the values determined by titration.

The reaction is preferably, but not necessarily, carried out in the absence of solvents. Suitable isocyanate-inert solvents may optionally be used. Suitable solvents are, for example, ethyl acetate, butyl acetate, ethylene glycol monomethyl-or monoethyl ether acetate, 1-methoxypropyl-2-acetate, butoxypropyl-2-acetate, 2-butanone, 4-methyl-2-pentanone, cyclohexanone, toluene or mixtures thereof and also such solvents as propylene glycol diacetate, diethylene glycol dimethyl ether, diethylene glycol ethyl- and butyl ether acetate, N-methyl pyrrolidone and N-methyl caprolactam or mixtures of these solvents.

The end products of the process according to the invention are clear, substantially colorless polyisocyanates having the composition mentioned above. Solutions of the products according to the invention (in one of the above-mentioned solvents suitable-for the process according to the invention) have viscosities of 1500 to 15,000 mPa.s (23° C.) at a solids content of 80% by weight.

The polyisocyanate mixtures according to the invention show no significant reduction in their isocyanate content after storage for 90 days at room temperature.

According to the invention, the polyisocyanates according to the invention containing tertiary nitrogen may be converted with alkylating agents corresponding to the formula $R_3X$ into the corresponding quaternary polyisocyanates according to the invention.

Suitable alkylating agents $R_3X$ are those in which $R_3$ is $C_{1-5}$ alkyl, allyl, methallyl or benzyl, preferably methyl, ethyl, allyl and benzyl, and X is the residue of a strong acid such as, for example, hydrohalic acid or sulfuric acid.

Preferred alkylating agents are, for example, methylene chloride, methyl bromide, methyl iodide, allyl chloride, benzyl chloride, dimethyl sulfate, etc.

The alkylation is carried out at 0 to 100° C. and preferably at 10° to 80° C., preferably in the absence of solvents.

The alkylation may be carried out in bulk or in suitable inert solvents. Suitable inert solvents are, for example, hydrocarbons, such as hexane, pentane, cyclohexane, benzene, toluene, xylene; halogenated hydrocarbons, such as dichloromethane, trichloromethane, dichloroethane, trichloroethane, chlorobenzene, bromobenzene, dichlorobenzene; ethers, such as diethyl ether, diisopropyl ether, anisole, dibutyl ether; nitriles, such as acetonitrile, propionitrile and benzonitrile. The alkylating agent may also be used as diluent providing it can be readily recovered, as is the case, for example, with methyl chloride, ethyl chloride, methyl iodide or propyl bromide.

Instead of alkylation, simple protonation may also be selected and conduction for the polyisocyanates containing tertiary nitrogen according to the invention. Protonation is preferably carried out with acids which have a $pK_a$ value, as measured in water, of less than 3 and, more preferably, less than 2. Suitable acids are, for example, the hydrohalic acids HCl, HBr, HI; sulfuric acid, phosphoric acid; sulfonic acids, such as benzene, chlorobenzene and toluene sulfonic acid; and phosphonic acids, such as chlorobenzene or cyclobenzene phosphonic acid; also perchloric acid, trifluoroacetic acid, trifluoromethane sulfonic acid, methane-sulfonic acid, tactic acid, etc.

The outstanding solubility or dispersibility in water of the polyisocyanate mixtures according to the invention in their at least partially alkylated and/or protonated form makes the polyisocyanates according to the invention easy-to-handle, valuable water-containing crosslinking agents for water-containing binders.

Outstanding advantages of the products according to the invention are:

1) improved reactivity to hydroxyl and polyhydroxyl components in two-component and three-component polyurethanes.
2) hence, there is no need for the use of heavy metal catalysts therewith,
3) outstanding stability of the aqueous emulsions of the products according to the invention, in their at least partially alkylated or protonated form,
4) hence there is no need for solvents,
5) reduced permanent overall hydrophilicity by comparison with known products,
6) improved adhesion of the products according to the invention after at least partial alkylation or protonation.

Whether the water-containing systems are solutions or dispersions will depend primarily on the concentration of hydrophilic centers and is of secondary importance so far as subsequent application is concerned.

The polyisocyanate mixtures according to the invention are valuable starting materials for the production of polyurethane plastics by the isocyanate polyaddition process. Aqueous solutions and dispersions of the at least partially alkylated and/or protonated polyisocyanates are preferably used for this purpose and may be reacted in combination with polyhydroxyl compounds dispersed in water in water-based two-component systems. It is particularly preferred to use the polyisocyanate mixtures according to the invention, preferably in at least partially alkylated and/or protonated form, as crosslinking agents for binders or binder components dissolved or dispersed in water in the production of coatings or adhesives using water-containing compositions based on such binders or binder components. The crosslinking agents may be combined with the binders or binder components simply by stirring before processing of the compositions by any methods. The following binders or binder components, for example, are mentioned in this regard: polyurethanes dispersed in water which can be crosslinked with polyisocyanates by virtue of the active hydrogen atoms present in the urethane materials or groups; hydroxy-functional polyacrylates dissolved or dispersed in water, particularly those having a molecular weight in the range from 1000 to 100,000, which represent valuable two-component binders with organic polyisocyanates as crosslinker or optionally urethane-modified hydroxyfunctional polyester resins—of the type known from polyester and alkyd resin chemistry—dispersed in water.

In general, the water-containing binders formulated with the polyisocyanate mixtures according to the invention, in which the usual auxiliaries and additives may be incorporated, show favorable technical properties even after drying at room temperature.

In the following Examples, all percentages are by weight, unless otherwise indicated.

STARTING PRODUCTS, POLYISOCYANATES

Polyisocyanate 1

Biuret polyisocyanate based on 1,6-diisocyanatohexane which consists essentially of N,N',N''-tris-(6-isocyanatohexyl)biuret and its higher homologs; NCO content 21.0%, monomeric 1,6-diisocyanatohexane content <0.5%, viscosity at 28° C. 8500 mPa.s, average NCO functionality approx. 3.3.

Polyisocyanate 2

Isocyanurate polyisocyanate prepared by partial trimerization of the isocyanate groups of 1,6-diisocyanatohexane and consisting essentially of tris-(6-isocyanatohexyl)-isocyanurate and its higher homologs; NCO content 21.6%, monomeric diisocyanate content <0.3%, viscosity at 28° C. 1700 mPa.s, average NCO functionality approx. 3.3.

Polyisocyanate 3

Isocyanatoisocyanurate obtained by trimerization of isophorone diisocyanate (IPDI) and having an NCO functionality of approx. 3.3, 70% solution in an aromatic hydrocarbon mixture Solvesso 100, NCO content of the solution 11%.

Polyisocyanate 4

Bis-(6-isocyanatohexyl)-uretdione; NCO content 21.5%, viscosity at 23° C. 80 mPa.s.

| STARTING PRODUCTS, MODIFYING AGENTS | | |
|---|---|---|
| 1 | 2-Hydroxyethyl morpholine | [131] |
| 2 | 2-Hydroxyethyl piperidine | [129] |
| 3 | 2-Hydroxyethyl piperazine | [130] |
| 4 | 2-Hydroxyethyl oxazoline | [115] |
| 5 | N-Dibutyl ethanolamine | [173] |

STARTING PRODUCTS, POLYETHERS

Polyether 1 n-Butanol-started monofunctional polyethylene oxide/polypropylene oxide polyether; molecular weight 2150, ethylene oxide content 80%.

Polyether 2

3-Ethyl-3-hydroxymethyloxetane-started monofunctional polyethylene oxide polyether; molecular weight 1210.

Polyether 3

Bifunctional propylene glycol-started polypropylene oxide/polyethylene oxide polyether; molecular weight 2000 (containing 25% ethylene oxide).

Polyether 4

Bifunctional ethylene glycol-started polyethylene oxide polyether; molecular weight 1500.

Polyether 5

Bifunctional propylene glycol-started polypropylene oxide polyether, molecular weight 1000.

EXAMPLE 1

50 g (0.382 mol) 2-hydroxyethyl morpholine are added dropwise over a period of 30 minutes at 45° C. to 1000 g polyisocyanate 2. The mixture is then heated to 90° C. and kept at that temperature for 1.5 hours. After cooling to 60° C., 43.3 g dimethyl sulfate are added dropwise. After 30 minutes, the reaction mixture is cooled to room temperature.

A light yellow resin having an NCO content of 17.9% by weight and a viscosity of 4300 mPa.s is obtained. The quaternary nitrogen content is 32.7 meq/100 g. A 25 g sample is dispersed in water at room temperature to form a fine-particle emulsion which remains stable in storage for longer than 1 day.

EXAMPLE 2

The procedure is exactly the same as in Example 1, except that only 28.9 g dimethyl sulfate are used. The resin obtained has a viscosity of 4400 mPa.s and a quaternary nitrogen content of 21.8 meq/100 g. A fine-particle emulsion storable for 24 h is obtained by mixing 1 part by weight resin with 2 parts by weight water at 1500 vibrations per minute in a Janke & Kunkel Vibrofix mixer.

EXAMPLES 3 and 4

Example 1 is repeated, but without dimethyl sulfate. The polyisocyanate preparation has a viscosity of 4100 mPa.s, a tertiary nitrogen content of 36.8 meq/100 g and a corrected NCO value of 18.95%.

A fine-particle emulsion storable for several hours is obtained by mixing 1 part by weight of this resin with 3 parts by weight water containing 10% by weight acetic acid in Example 3 and 10% by weight tactic acid in Example 4, in the Vibrofix mixer.

EXAMPLES 5 to 15

Polyisocyanate preparations according to the invention are prepared as in Example 1. The starting materials and the properties of the resulting polyisocyanate preparations are set out in Table 1 below.

TABLE 1

| Example # | Polyisocyanate | Modifying agent Type | Modifying agent Quantity/100 g | Polyol Type | Polyol Quantity/100 g | NCO content [%] | Basic nitrogen meq/100 g | Ethylene oxide, % by weight |
|---|---|---|---|---|---|---|---|---|
| 5 | 1 | 1 | 50 | — | — | 18.2 | 36.4 | — |
| 6 | 2 | 1 | 30 | — | — | 20.1 | 21.6 | — |
| 7 | 2 + 4* | 1 | 30 | — | — | 19.6 | 21.6 | — |
| 8 | 2 + 4** | 1 | 30 | — | — | 19.5 | 21.6 | — |

TABLE 1-continued

| Example # | Polyiso-cyanate | Modifying agent Type | Modifying agent Quantity/100 g | Polyol Type | Polyol Quantity/100 g | NCO content [%] | Basic nitrogen meq/100 g | Ethylene oxide, % by weight |
|---|---|---|---|---|---|---|---|---|
| 9 | 2 + 4** | 1 | 30 | 1 | 30 | 18.9 | 21.6 | 2.4 |
| 10 | 3 | 1 | 60 | 2 | 60 | 10.9*** | 55.9*** | 5.4 |
| 11 | 2 | 1 | 40 | — | — | 19.4 | 29.8 | 5.5 |
| 12 | 2 | 1 | 40 | — | — | 19.5 | 29.6 | — |
| 13 | 2 | 1 | 40 | 2 | 40 | 18.4 | 32.2 | 3.3 |
| 14 | 2 | 1 | 30 | 3 | 60 | 18.7 | 21.0 | 1.4 |
| 15 | 2 | 1 | 30 | 4 | 60 | 18.7 | 21.2 | 5.6 |

*Ratio 60:40
**Ratio 40:60
***Based on solids, 50% solution in methoxypropyl acetate

EXAMPLE 16

In this Example, the material of Example 10 is reacted in a 50% solution in methoxypropyl acetate with dimethyl sulfate (70% of the theoretical amount) (based on the tertiary nitrogen). Reaction time: 30 minutes at 50° C. A clear light yellow resin solution having a quaternary nitrogen content of 39.1 meq/100 g solids is obtained.

A fine-particle emulsion, stable in storage for longer than 1 week is obtained by mixing 1 part by weight of this solution with 3 parts by weight in the Vibrofix.

Where 95% of the theoretical amount of dimethyl sulfate is used under otherwise exactly the same conditions (now 53.1 meq/100 g), an even finer, storable emulsion is obtained.

EXAMPLE 17

15 g polyether 1 are added at 60° C. to 465 g, polyisocyanate 2. 15.8 g oxypropyl morpholine are slowly added dropwise and the mixture is heated to 105° C. and kept at that temperature for 3 hours. 41 g propylene glycol monomethylether acetate are added for dilution and, after cooling to ambient temperature, a solution of 9.5 g methane sulphonic acid in 16 g propylene glycol monomethylether acetate is slowly added.

A 90% strength solution having a viscosity of 1900 mPa.s and an NCO content of 19.3% is obtained.

EXAMPLE 18

150 g trimeric 4,4'-diisocyanato-dicyclohexylmethane (NCO=15.25%) are dissolved at 60° C. in 155 g propylene glycol diacetate; after addition of 35 g polyether 2 and 5 g oxypropyl morpholine the mixture is stirred for 1 hour at 100° C. After cooling to 90° C, 1 drop of dibutyl tin dilaurate is added as a catalyst, and the mixture is stirred for another 2 hours at 100° C. After cooling, a light yellow resin solution having an NCO-content of 11.0% and a solids content of 55% is obtained. The resin contains 18.2 meq/100 g of base nitrogen.

APPLICATION EXAMPLE 1

A 64.9 g polyisocyanate 3 (70%)
146.1 g polyisocyanate of Example 10 according to the invention (50%) are added to 26.9 g of a trifunctional polyoxypropylene polyether (molecular weight 445) at an NCO:OH ratio of 1. Both solutions are adjusted to a solids content of 60% by dilution with the corresponding quantities of methoxypropanol acetate.

Conversions of 33.7% of the theoretical (A) and 70.7% of the theoretical (B) were measured by NCO titration after 10 hours at 80° C. (in solution). Solution B is considerably more viscous.

This Example illustrates the higher reactivity of the isocyanates according to the invention.

APPLICATION EXAMPLE 2

100 g of the 30% cationic polyurethane dispersion of Example 1 of EP 148 392 (US-P-4,623,416) are thoroughly mixed with 10 g of the polyisocyanate of Example 16a according to the invention. A fine-particle emulsion storable for longer than 24 hours is obtained.

Adhesive testing on Nora test rubber in accordance with DIN 53 273 (after 7 days) produces a peel strength of 8.8 kg/cm as against 7.0 kg/cm without the addition of the polyisocyanate according to the invention.

APPLICATION EXAMPLE 3

100 g of the 30% cationic polyurethane dispersion of Example 1 according to EP 148 392 (US-P-4,623,416) are thoroughly mixed with 10 g of the polyisocyanate of Example 16a according to the invention. This mixture is used to make a bond in accordance with ASTM 816 D. A 4 mm thick PVC containing 30% dioctyl phthalate as plasticizer was used as the material to be bonded.

Before the adhesives were applied, the surfaces to be bonded were thoroughly roughened with 40-grain abrasive tape. The materials freed from abrasion dust were coated with an approx. 0.1 mm thick adhesive layer. After airing for 30 minutes, the adhesive surfaces were heated by radiation in three seconds to a temperature of 80° to 85° C. The adhesive strips are then fitted together in such a way that an overlapped area of 2.5×2.5 cm is obtained. The test specimens are pressed for 10 seconds under a pressure of 0.4 mPa.

To determine heat resistance in accordance with ASTM 816 D, the test specimens stored for 9 days at room temperature were subjected to a shear test. To this end, a load of 11 kg is applied to the test specimen. After heating for 20 minutes at 40° C., the temperature at which the bond fails is determined by increasing the temperature at a rate of 0.25° C. per minute. The temperatures reached are 98° C. with the polyisocyanate according to the invention and 81° C. without the addition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A polyisocyanate mixture characterized by
a) an average NCO functionality of 2.3 to 4.3,
b) a content of (cyclo)aliphatically bound isocyanate groups of 10.0 to 20.5% by weight, c) a content of incorporated tertiary nitrogen of 5 to 250 milliequivalents per 100 g, d) a content of ethylene oxide units arranged in polyether chains of 0 to 15% by weight.

2. A process for the production of the polyisocyanate mixture claimed in claim 1, comprising reacting:

A) a polyisocyanate component having an (average) NCO functionality of at least 2.1 and comprising at least one polyisocyanate consisting of (cyclo)aliphatically bound isocyanate groups, with B) a modifying component comprising a compound containing at least one tertiary nitrogen and at least one isocyanate-reactive group, and optionally with, C) a polyether alcohol component containing at least 50% by weight ethylene oxide units incorporated in polyether chains and having a molecular weight of 350 to 3500, and optionally with, D) other polyhydroxyl compounds different from components B) and C), maintaining during the reaction an NCO:OH equivalent ratio of 2:1 to 75:1.

3. A process for crosslinking water-soluble or water-dispersible binders or binder components in the production of adhesive bonds, coatings and coating compositions comprising water-containing compositions based on such binders or binder components, comprising mixing with the binders or binder components the polyisocyanate mixture of claim 1, optionally in at least partly alkylated or protonated form.

4. The polyisocyanate mixture of claim 1 in which the content of incorporated tertiary amine nitrogen is from 15 to 100 milliequivalents per 100 g.

* * * * *